United States Patent [19]

Renders et al.

[11] Patent Number: 4,975,792
[45] Date of Patent: Dec. 4, 1990

[54] MAGNETIC-TAPE APPARATUS COMPRISING A THREADING MECHANISM FOR THE DISPLACEMENT OF A MAGNETIC TAPE AND A BELT SO AS TO FORM TAPE BUFFERS

[75] Inventors: Martinus A. Renders; Budiman Sastra, both of Eindhoven, Netherlands

[73] Assignee: U.S. Philips Corporation, New York, N.Y.

[21] Appl. No.: 325,588

[22] Filed: Mar. 17, 1989

[30] Foreign Application Priority Data

Apr. 5, 1988 [NL] Netherlands ............ 8800855

[51] Int. Cl.$^5$ ............ G11B 5/008; G11B 15/00; G11B 17/00
[52] U.S. Cl. ............ 360/85; 360/95; 360/74.3; 242/75.3
[58] Field of Search ............ 360/93, 95, 85, 132, 360/74.3; 242/75.3, 75.51; 226/118

[56] References Cited

U.S. PATENT DOCUMENTS

| | | | |
|---|---|---|---|
| 3,890,641 | 6/1975 | Mo et al. | 226/95 |
| 3,942,190 | 3/1976 | Detwiler | 360/63 |
| 4,104,685 | 8/1978 | Chang | 242/75.3 |
| 4,170,787 | 10/1979 | Gunschmann et al. | 360/95 |
| 4,191,979 | 3/1980 | Poehler | 360/85 X |
| 4,390,909 | 6/1983 | Sakamoto | 360/74.3 |
| 4,769,726 | 9/1988 | Platte et al. | 360/84 |
| 4,797,760 | 1/1989 | Rademecher et al. | 360/95 X |

FOREIGN PATENT DOCUMENTS

| | | |
|---|---|---|
| 0184147 | 6/1986 | European Pat. Off. . |
| 0265987 | 3/1988 | European Pat. Off. . |
| 5542335 | 3/1980 | Japan ............ 360/95 |

*Primary Examiner*—John H. Wolff
*Assistant Examiner*—Alfonso Garcia
*Attorney, Agent, or Firm*—Bernard Tiegerman

[57] ABSTRACT

A magnetic-tape apparatus is disclosed which includes a drive mechanism for driving a magnetic tape and tape reels, a magnetic-head mechanism buffer mechanism comprising a belt (8), guide elements for guiding the belt in an operational position, a tape-threading mechanism which during the thread-out phase threads the tape out of the cassette and wraps it around the magnetic-head mechanism and during the thread-in phase threads the tape into the cassette. A belt-threading mechanism threads the belt between the guide elements into the tape path during said thread-out phase and brings the belt back into its initial position during the thread-in phase. The apparatus (1) also includes a mechanism for moving the belt-threading mechanism in such a way that the belt can be brought into the desired operational position and into said initial position.

18 Claims, 9 Drawing Sheets

MAGNETIC-TAPE APPARATUS COMPRISING A THREADING MECHANISM FOR THE DISPLACEMENT OF A MAGNETIC TAPE AND A BELT SO AS TO FORM TAPE BUFFERS

BACKGROUND OF THE INVENTION

The invention relates to a magnetic-tape apparatus, having a frame and reel-drive means for two rotatable reels on which a magnetic tape is wound for the purpose of tape transport from one reel to the other, a length of said magnetic tape extending between the two reels. The apparatus has at least one magnetic head for recording and/or reproducing information on/from the magnetic tape, and movable tape-threading means constructed to bring the magnetic tape, which is movable between an initial position, in which the magnetic tape is not in contact with the magnetic-head means, and an operational position, in which the magnetic tape is in contact with the magnetic-head means, into said initial position or said operational position. Buffer means in the apparatus capable of buffering parts of the length of the magnetic tape comprise an endless flexible belt having two guide sections which constitute tape guides for the magnetic tape. The magnetic tape is guided over the outer sides of the guide sections, the buffer means, in said operational position, forms two tape buffers which in relation to the tape transport are situated upstream and downstream of the magnetic-head means. Movable belt-threading means bring the flexible belt, which is movable between an initial position, in which the belt is not in contact with the magnetic tape and is positioned at that side of the magnetic tape which is remote from the magnetic-head means and in which the belt-threading means are situated within the circumference of the belt, and an operational position, in which the belt is in contact with the magnetic tape in such a way that the belt can act as a buffer, into said initial position or said operational position of the belt. Tape-drive means drive the magnetic tape past the magnetic-head means at a location in that part of the tape path which is situated between the first and the last tape buffer. The apparatus also has two pairs of guide elements between which the belt is guided in its operational position, the two guide elements of each pair, viewed in the tape-transport direction, respectively define the beginning and the end of the guide sections of the belt in the operational position and guide the magnetic tape in the operational position towards and away from the guide sections, the paths of movement of the tape-threading means extending between said pairs of guide elements.

A tape-transport device for such a magnetic-tape apparatus has been proposed in U.S. application Ser. No. 496,060, filed 3/16/90, which is a continuation of Ser. No. 311,438 filed Feb. 15, 1989, now abandoned, which is a continuation of Ser. No. 024,731 filed Mar. 11, 1987, now abandoned, (herewith incorporated by reference), which aims at providing a tape-transport device in which the reel movement and the movement of the tape past the magnetic-head means are dynamically isolated from one another in such a way that strongly varying speeds of the tape past the magnetic head means can be realized with a minimal delay. This tape-transport device comprises magnetic head means and reel-drive means comprising two rotatable reels on which a magnetic tape is wound, which tape, as it is unwound, is moved in its longitudinal direction away from one of the reels with a first speed, which tape is moved passed the magnetic-head means with a second speed which is variable in magnitude relative to the first speed. The buffer means comprises an endless belt, with two tape guides which are formed by guide sections of the running belt and which control tape buffers disposed in the tape path between said reels and the magnetic-head means. The positions of the guide sections relative to the axis of rotation of the reels and the magnetic head means can be changed in order to change the length of the tape of the tape buffers, which results the reel rotations being isolated from the movement of the tape past the magnetic-head means.

Moreover, the tape transport device proposed in said Patent Application enables the magnetic head and the belt to be moved between their respective initial positions and their operational positions with the aid of movable tape and belt-threading means. In said tape-transport device the belt comprises two end portions bent through 180° between which straight connecting portions are situated and in the operational position the belt is guided between two pairs of guide elements. In the operational position such a belt offers resistance to the motion movement between the guide elements because this requires some degree of elastic deformation of the belt. Moreover, owing to its shape such a belt cannot readily be positioned between the guide elements but must be inserted between the guide elements in a specific orientation.

SUMMARY OF THE INVENTION

It is the object of the invention to construct a magnetic-tape apparatus whose buffer system comprises a belt that offers less resistance to deformation and, consequently, offers less resistance to motion and to deformation during the displacement between the initial position and the operational position. To this end, the invention is characterized in that in the non-constrained situation, i.e. the situation in which the belt is not subject to any external forces, the flexible belt has at least substantially the shape of a circle, and the mutual arrangement of the guide elements and the properties of the belt are such that, if the center of the figure bounded by the belt circumference is situated between the four guide elements, the belt is in a stable situation in which, as a result of the balance between the internal forces caused by elastic deformation of the belt and the forces exerted on the belt by the guide elements, the belt adopts a shape characterized by two end portions which are bent through 180° and which adjoin two substantially parallel straight portions. This yields a magnetic-tape apparatus in which, owing to its originally circular shape, the belt offers less resistance to motion because the elastic deformation is smaller and is the same for every part of the belt during a revolution, enabling the belt to be brought more simply into the operational position because the shape of the belt does not impose any preferred orientation.

A preferred embodiment of the magnetic-tape apparatus in accordance with the invention is characterized in that in said initial position the belt is clamped between at least one stationarily arranged element and the tape-threading means and in said initial position the belt is situated in the space between the two reels and the magnetic tape. This is an advantage if instead of separate reels the reels are accommodated in a cassette, for which it is necessary that after loading of the cassette the belt is situated in a recess in the cassette and that the belt is situated at that side of the magnetic tape which faces the reels.

Another preferred embodiment of the magnetic-tape apparatus is characterized in that the guide elements are arranged stationarily and the belt is deformed elastically as the it is brought into said operational position with the aid of the belt-threading means.

As a result of this the guide elements need not be movable to bring the belt into the operational position.

A further preferred embodiment of the magnetic-tape apparatus is characterized in that the belt-threading means comprise a belt-threading pin, and the path of movement of the belt-threading pin extends between those two guide elements, one of each pair, which are situated at the side of the reels and between both guide elements of one of the pairs, and as the belt is brought into said operational position the belt-threading pin brings the entire belt into one of the tape-path branches between the magnetic-head means and the reels, after which by take-up onto at least one of the reels the magnetic tape is moved partly from one tape-path branch into the other tape-path branch to assume its operational position.

As a result of this only one belt-threading pin is required for bringing the belt into its operational position. The known tape-transport device does not comprise any means with which the threading means can be displaced. To this end a further preferred embodiment of the magnetic tape apparatus is characterized in that the belt-threading means comprise a belt-threading pin, in that each threading means is secured to an arm at one end of said arm, which arm near its other end is secured to a rotatable spindle having substantially the same orientation as the threading means, in that during threading-in the two tape-threading means are moved first and subsequently the belt-threading pin, and during threading-out the belt-threading pin is moved first and subsequently the tape-threading means, in that the movement of the arm of the belt-threading pin is performed in another plane than the movement of the nearest arm of one of the tape-threading means, and in that the arms to which the tape-threading means are secured are curved in such a way that the movement of the arms is not restrained by the presence of the guide elements or by the presence of the spindles to which the arms are secured.

This results in a compact construction, which can perform the required displacements for the tape and belt-threading means, which comprises a small number of parts and in which the displacement is attended with minimal friction.

A further preferred embodiment of the magnetic-tape apparatus is characterized in that the arm of the belt-threading pin is arcuate, and the arms of the tape-threading means each comprise two portions which extend at an angle of approximately 90° relative to one another. This is necessary in order to ensure that the movement of the threading means is not obstructed by the drive spindle of the arm of the belt-threading pin and by the guide elements.

A further preferred embodiment of the magnetic-tape apparatus is characterized in that the guide elements are constructed as guide rollers, in that the tape-drive means comprise a capstan and a pressure roller, in that the belt-threading means comprise a belt-threading pin, in that the tape-threading means are constructed as tape-threading rollers, of which at least one of the two rollers functions as a pressure roller for the capstan, in that the magnetic-head means comprise a rotatable and a stationary magnetic-head unit, which rotatable magnetic-head unit comprises at least one rotatable magnetic head and which stationary magnetic-head unit comprises at least one stationary magnetic head, in that the frame comprises a supporting plate formed with openings through which the tape-threading rollers can move, and in that the drive means for the reels comprise drive spindles.

This results in a construction which exhibits minimal friction between the tape and the guide and tape-threading rollers during tape transport. Moreover, on account of the rotatable magnetic-head unit the apparatus can now be constructed as a helical-scan apparatus.

Yet another preferred embodiment of the magnetic-tape apparatus is characterized in that the two reels are accommodated in a magnetic-tape cassette whose housing is provided with two tape guides near the front corners, between which tape guides a taut part of the tape extends when the cassette is not in operation, which housing has a recess behind said part of the tape, which recess has such a shape that the endless belt can be positioned in said recess, and in that the threading means are adapted to withdraw the magnetic tape and the belt from the magnetic-tape cassette towards the magnetic-head means to bring the magnetic tape and the belt into their respective operational positions. This has the advantage that during loading of the cassette the cassette housing can be placed with its recess over the belt, so that during threading-in of the magnetic tape the belt does not obstruct the tape and during the threading-in movement towards the operational position the belt is readily movable into a position between the guide elements.

A further preferred embodiment of the magnetic-tape apparatus is characterized in that the plane of movement of the arm of the belt-threading pin is situated above the planes of movement of the arms of the tape-threading means. This is necessary because if the plane of movement of the belt-threading pin should coincide with the planes of movement of the arms of the tape-threading means the arms would restrain each other's motions.

A further preferred embodiment of the magnetic-tape apparatus is characterized in that during threading-in of the belt and the magnetic tape, when they are both brought from an operational position into an initial position, after the movement of the belt-threading pin the right-hand tape-threading means begins to move first, followed by the left-hand tape-threading means.

This has the advantage that the belt resumes the same position as in the initial situation. As a result of this no additional operations are required to attain the required initial position of the belt, in which a cassette can be placed over the belt.

Yet another preferred embodiment of the magnetic-tape apparatus in accordance with the invention is characterized in that the belt is made of polyethylene terephthalate. This material is already elastically deformable under a very small external force and resumes its original shape if said external force is removed.

BRIEF DESCRIPTION OF THE DRAWINGS

An embodiment of a magnetic-tape apparatus in accordance with the invention will now be described in more detail, by way of example, with reference to the drawings. In the drawings.

DESCRIPTION OF THE PREFERRED EMBODIMENTS

Figure 1:
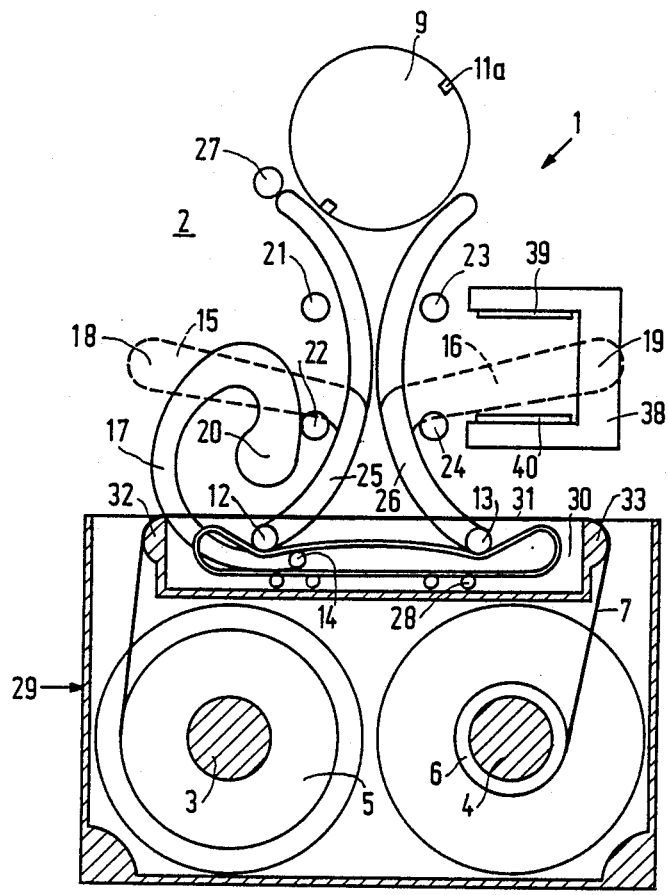
FIG. 1 is a cut-away plan view showing an embodiment of the magnetic-tape apparatus in the initial situation immediately after loading of the cassette.

The magnetic-tape apparatus 1 is constructed to cooperate with a magnetic tape 7 accommodated in a cassette 29. The magnetic tape 7 is wound on reels 5, 6 accommodated in the housing of the cassette 29. After the cassette 29 has been loaded into the magnetic-tape apparatus 1 the reels 5, 6 can be driven by electric motors 41, 42 by means of spindles 3, 4 which form part of the reel-drive means. The magnetic-tape apparatus 1 comprises magnetic-head means which in the present embodiment comprise a rotatable magnetic-head unit, which comprises a rotatable drum 9 carrying two rotatable magnetic heads 11a, and a stationary magnetic-head unit 10, not shown in FIG. 1 and comprising a stationary magnetic head 11b. A shutter, not shown, is arranged at the front of the cassette 29 in its open position it exposes a length of tape 31. In the initial position of the magnetic-tape apparatus 1, in which the magnetic tape 7 is not in contact with the magnetic-head means, said length of tape 31 is stretched over two tape guides 32, 33 disposed near the two front corners of the cassette 29. Behind this length of tape 31 the cassette 29 has a recess 30 in which a flexible endless belt 8 is situated in an initial position, which initial position is characterized by the fact that the belt 8 is not in contact with the magnetic tape 7. A belt-threading means constructed as a belt-threading pin 14 is arranged within the circumference of the belt 8. This belt 8 is clamped between, on the one hand, four pins 28 arranged on a supporting plate 2 and, on the other hand, two tape-threading means constructed as tape-threading rollers 12, 13. In the initial position of the belt 8 the pins 28 and the tape-threading rollers 12, 13 are also situated in the recess 30 formed in the cassette 29. The supporting plate 2 forms part of the frame of the apparatus 1. The tape-threading rollers 12, 13 and the belt-threading pin 14 are secured to arms 15, 16, 17 connected to spindles 18, 19, 20 which, in a manner not shown, can be driven by one or more electric motors.

In the operational position of the magnetic tape 7, in which the magnetic tape 7 is in contact with the magnetic-head means (FIG. 6), buffer means are situated between the magnetic-head means and the cassette 29. The buffer means comprise the endless belt 8, which in its operational position, in which the belt 8 is in contact with the magnetic tape 7, is guided at its outer circumference between guide elements 21, 22, 23, 24 constructed as rollers arranged on the supporting plate 2. These guide rollers 21, 22, 23, 24 guide the magnetic tape 7 near the entry and exit locations of the magnetic tape 7 in tape buffers 34, 35 formed by the belt 8, which locations also constitute the beginning and the end respectively of the guide sections 36, 37 of the belt 8 which function as tape guides. The arm 17 on which the belt-threading pin 14 is arranged, is arcuate in order to enable the rotation required for threading the belt 8 to be realised without being obstructed by one of the guide rollers 21, 22, 23, 24. The arms 15, 16 of the tape-threading rollers 12, 13 each comprise two portions which extend at an angle of substantially 90° relative to each other in order not to be obstructed by the spindle 20 of the arm 17 of the belt-threading pin 14. The arm 17 of the belt-threading pin 14 extends above the supporting plate 2 and the arms 15, 16 of the tape-threading rollers 12, 13 are situated underneath the supporting plate 2. Openings 25, 26 formed in the supporting plate 2 allow movement of the tape-threading rollers 12, 13 and define the paths of movement of the tape-threading rollers 12, 13.

In the operational position the magnetic tape 7 is driven by tape-drive means comprising a pressure-roller/capstan 27 combination driven by an electric motor 43. Driving is effected at the location of the left-hand tape-threading roller 12, which functions as the pressure roller for the capstan 27 on the supporting plate 2. In the operational position of the belt 8 the position of the right-hand guide section 37 is dictated by position-detection means comprising a position-detection unit 38 provided with a combination of a light source 39 and a light-sensitive cell 40. In the left-hand tape-path branch, between the tape-drive means and the left-hand tape buffer 34, tape-tension detection means 44 are arranged. These means 44 comprise a pressure roller 46 which presses against the magnetic tape 7 with a substantially constant pressure. The tension in the magnetic tape 7 is derived from the position of the pressure roller 46.

For controlling the tape tension and the position of the belt 8 and for locating information on the tape 7 the drive means are controlled by a control unit comprising a microprocessor 45. This microprocessor 45 receives measurement signals (a) from the tape-tension detection means 44, from the position-detection unit 38, and from the magnetic-head units 9, 10, which together with signals (c) corresponding to the desired situation are processed to derive control signals (b) supplied by the microprocessor 45 for controlling the electric motors 41, 42, 43 for the drive systems. The signals (c) corresponding to the desired situation are obtained from input means, not shown, which may be external to or arranged in the apparatus 1. Said input means may be constituted by a computer.

Figure 10:
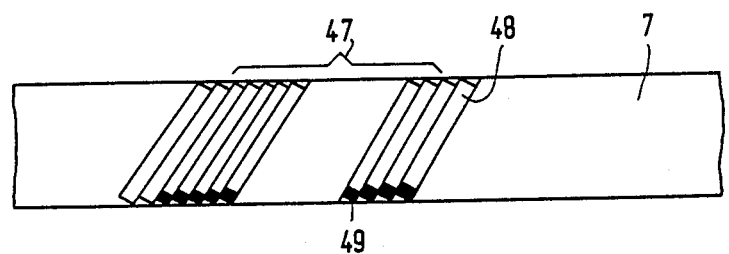
FIG. 10 illustrates the information on the magnetic tape which cooperates with a magnetic-tape apparatus comprising rotary magnetic-head means.
Figure 11:
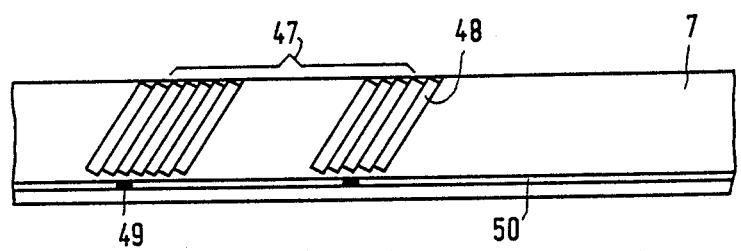
FIG. 11 illustrates the information on the magnetic tape which cooperates with a magnetic-tape apparatus comprising rotary and stationary magnetic-head means.

In order to make the apparatus 1 described above suitable for the storage of large amounts of information, in such a way that random access to the information on a specific length of tape is possible, the microprocessor 45 should be capable of performing a plurality of additional operations to be described hereinafter. Moreover, the information on the magnetic tape 7 should meet some requirements to enable the system comprising the magnetic-tape apparatus 1 and the magnetic tape 7 to be used for the above purpose. To this end the information on the magnetic tape 7 is divided into sections 47 (FIG. 10) having a length which is smaller than or equal to the total length of the tape buffered by the two tape buffers 34, 35 and constituting the buffer capacity. In each section 47 the information is recorded in individual discrete tracks 48. Each section 47 has a magnetically recorded address 49 to locate a section 47 during fast winding. Reading and writing the address 49 from/onto the magnetic tape 7 is possible by means of the rotary magnetic heads 11a or by means of the stationary magnetic head 11b. In the latter case the magnetic tape 7 has a separate longitudinal track 50 (FIG. 11).

For controlling the tape drive in order to wind the magnetic tape 7 within the section 47 rapidly in either direction and hence bring the individual discrete tracks 48 before the magnetic-head means the system comprises control means, which include said microprocessor 45. For the rapid location of a selected address the system comprises a selection device, which also includes said microprocessor 45.

The operation of the apparatus 1 described in the foregoing will now be explained with reference to the figures. The magnetic-tape cassette 29 is loaded into the apparatus 1 and brought into an initial position (FIG. 1). In this position the shutter at the front of the cassette 29 is open to expose a length of tape 31 stretched between two tape guides 32, 33 arranged in the front part of the cassette 29. In this position the two reels 5, 6 in the cassette 29, on which the magnetic tape 7 is wound, engage with drive spindles 3, 4 of the apparatus 1.

Figure 2:
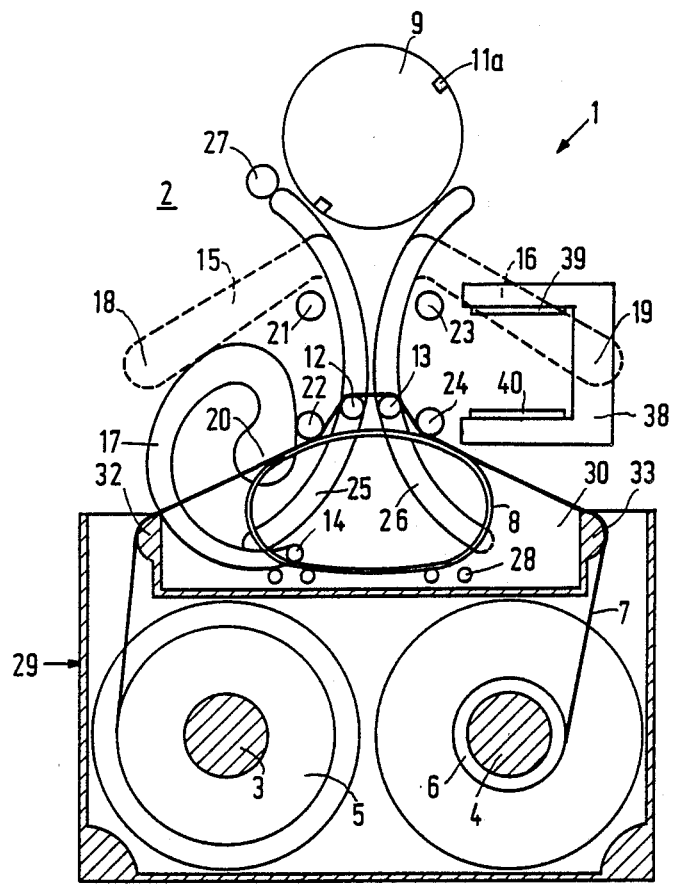
FIG. 2 shows a situation during threading-in of the magnetic tape.
Figure 3:
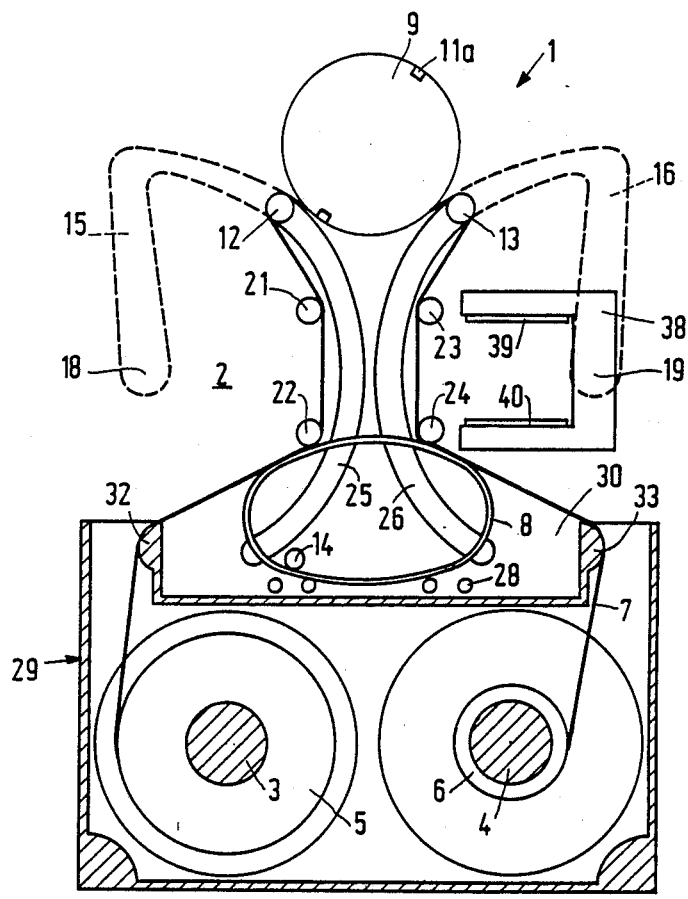
FIG. 3 shows the situation immediately after threading-in of the magnetic tape.

In the initial position the flexible belt 8 is situated in the recess 30 in the cassette 29 behind said length of tape 31. The belt 8 is clamped between, on the one hand, the four pins 28 on the supporting plate 2 and, on the other hand, the two tape-threading rollers 12, 13. The belt-threading pin 14 is situated within the periphery of the belt 8. During the tape thread-out phase the magnetic tape 7 is brought from said initial position into the operational position, in which the magnetic tape 7 is in contact with the magnetic head means 9, 10 (FIG. 3). The magnetic tape 7 is then withdrawn from the cassette 29 by means of the two tape threading rollers 12, 13 and is moved between the two pairs of guide rollers 21, 22 and 23, 24 (FIG. 2) to the magnetic-head means 9, 10, where the magnetic tape 7 is wrapped around the drum 9 through an angle of 90° (FIG. 3). The movement of the tape-threading rollers 12, 13 is passed by rotating the spindles 18, 19 of the arms 15, 16 to which the tape-threading rollers 12, 13 are secured. If the left-hand tape-threading roller 12 had been secured to a straight arm this arm would intersect the spindle 20. In order to solve this problem the arm 15 is constructed in such a way that it does not intersect said spindle 20 during threading-in and threading-out of the tape 7.

Figure 4:
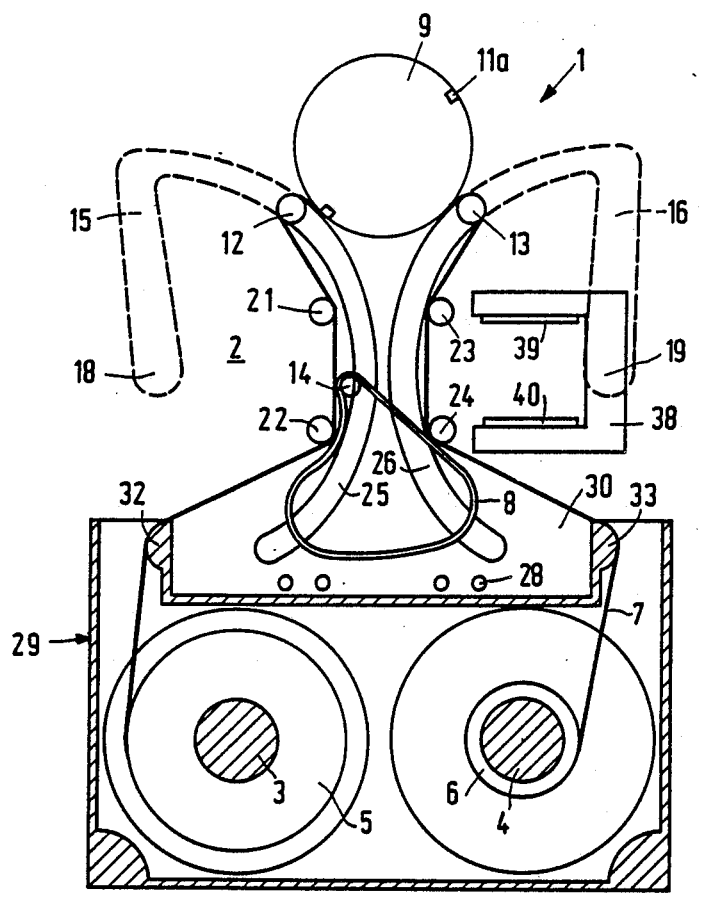
FIG. 4 illustrates a situation during threading-in of the belt.
Figure 5:
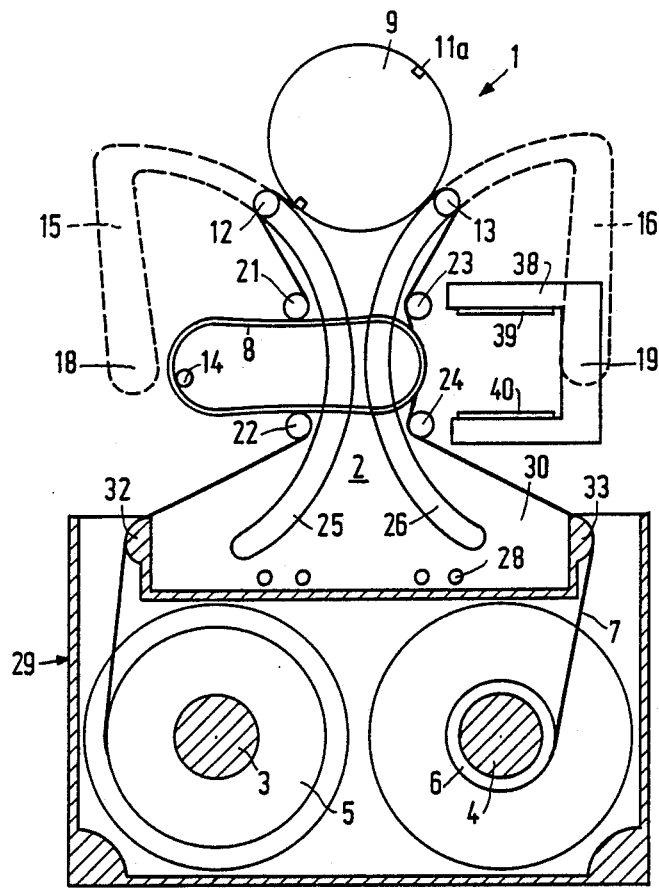
FIG. 5 shows the situation in which the belt is situated in the left-hand tape-path branch.
Figure 6:
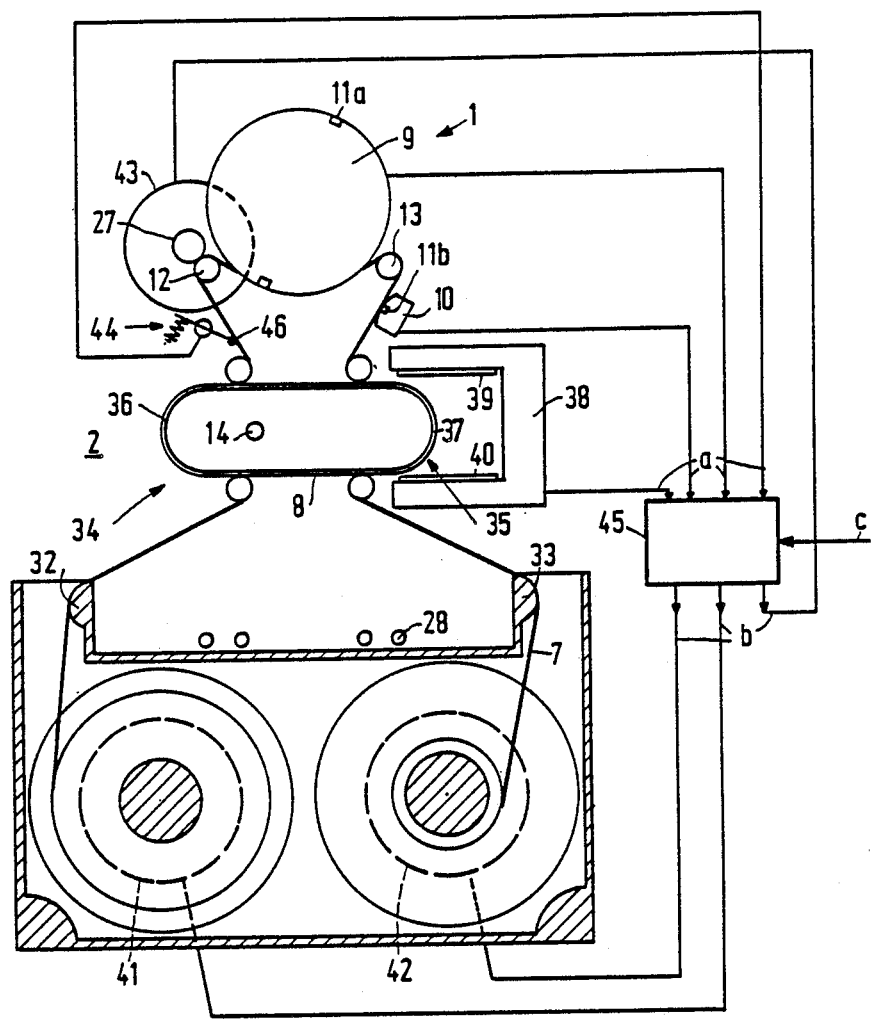
FIG. 6 shows the situation in which the belt is in the operational position.

Now the belt-threading phase is started, in which the belt 8 is threaded into the tape path by means of the belt-threading pin 14. First of all the belt 8 is threaded into the left-hand tape-path branch, which branch extends from the cassette 29 to the magnetic-head means 9, 10. This is achieved by rotating the spindle 20 of the curved arm 17 carrying the belt-threading pin 14 in the counter-clockwise direction. The belt-threading pin 14 then moves the belt 8 and draws it between those two guide rollers 22, 24, one of each pair, which are situated at the side of the cassette 29 and between the guide rollers 21, 22 of the left-hand pair (FIG. 4) until the belt 8 is situated wholly within the left-hand tape-path branch (FIG. 5). The belt-threading pin 14 then performs an arcuate movement through an angle of approximately 270° around the guide roller 22. Since the pivot of the arm 17 carrying the belt-threading pin 14 is situated at the location of the spindle 20 and since the plane in which the arm 17 moves is situated above the supporting plate 2, which also carries the guide roller 22, the arm 17 should be given an arcuate shape in order to move the belt-threading pin 14 around the guide roller 22. During this phase the belt 8 is deformed elastically and the magnetic tape 7 is unwound from the left-hand reel 5. Subsequently the belt-threading pin 14 is moved back until it is situated between the guide rollers 21, 22, 23, 24. Finally, in order to reach the operational position of the belt 8, the belt 8 is moved partly out of the left-hand tape-path branch into the right-hand tape-path branch by winding a small length of tape onto the left-hand reel 5 (FIG. 6).

In the operational situation the magnetic-tape apparatus 1 allows random access to any arbitrary section of the tape 7 of a specific length by moving the part of tape containing this section with a varying speed and in alternate directions past the magnetic-head means 9, 10, and for locating a specific section the magnetic tape 7 can be transported with a high speed during which transport the magnetic-head means 9, 10 scan the tape 7.

Random access is particularly suitable in the case of high-information-density tape-recording, preferably helical-scan recording, so that tape transport can be minimal and short access times can be achieved. Moreover, in the case of helical-scan recording the information on the tape 7 is accommodated in the required individual discontinuous tracks 48 (FIGS. 10 and 11). When helical scanning is used in the apparatus 1 in accordance with the invention this means that the tape can leave the plane of the reels 5, 6 only in the part situated between the two buffers 34, 35.

Locating a specific section 47 on the tape 7 at high speed is controlled by a selection device which comprises the microprocessor 45. Depending on the addresses 49 written by the magnetic heads 11a or 11b and the desired address entered via the input means said microprocessor 45 controls the drive of the reels 5, 6 in such a way that the tape 7 is moved at a higher speed until the desired address is found.

As a result of this high relative tape/head speed the inclined information track 48 on the magnetic tape 7 (FIG. 10) cannot be scanned correctly because the path of the magnetic heads 11 over the tape 7 extends at a different angle when the speed of rotation of the magnetic head drum 9 is not changed. However, it is possible to read the beginning of such an inclined track 48. This beginning should then contain the address 49 of the section 48. Another method of reading the relevant information from the tape 7 at high tape-transport speeds is to use an additional longitudinal track 50 on the tape 7 (FIG. 11), which is scanned by a stationary magnetic head 11b.

During this rapid-search mode the microprocessor 45 also controls the position of the belt 8 and the tape tension. In the operational position the belt 8 should remain guided between the four guide rollers 21, 22 or 23, 24. The position-detection unit 38 supplies information about the position of the belt 8 to the microprocessor 45, which provides a position correction by making the left-hand reel 5 rotate more rapidly or slowly. If the speed with which the left-hand reel 5 takes up the tape 7 is higher or lower than the speed with which the capstan 27 drives the tape 7, the tape tension in the left-hand tape-path branch will increase or decrease respectively, causing the belt 8 to be moved to the right or the left respectively in order to restore the balance between the forces exerted on the belt 8 by the tape 7.

In order to control the tape tension the microprocessor 45 controls the drive of the right-hand reel 6. If the speed with which the tape 7 is unwound from the right hand reel 6 is varied to be higher or lower than the speed with which the capstan 27 moves the tape 7, the tension in the right-hand tape-path branch is reduced or increased respectively. The balance between the forces acting on the belt 8 will cause the tape tension in the left-hand tape-path branch to change accordingly. The control system described above relates to tape transport from the right-hand reel 6 to the left-hand reel 5 but a similar line of reasoning can be applied to tape transport in the reverse direction.

Once the desired section has been found the information within the section can be read or random access can be applied to the information within the section. Effective random access to an information carrier requires that the relevant location on the carrier must be formed rapidly. For this purpose the tape transport past the magnetic-head means is controlled by control means which also include the microprocessor 45. For locating an information track 48 within a section 47 the microprocessor 45 should have information about the position of the track 48 within the section 47. This can be achieved by assigning a separate track address to every track or by counting the number of tracks traversed, starting from a known position (for example the middle of the section).

Since the masses of the two reels 5, 6 are too large to realise the required transport speeds via rotation of the reels with the aid of the electric motors 41, 42 in the apparatus 1, another solution should be adopted. The solution to this problem is that the reels 5, 6 should remain stationary and that the magnetic tape 7 is moved past the magnetic-head means 9, 10 by the tape-drive means 27, tape buffers 34, 35 being provided in the tape path at opposite sides of the magnetic-head means 9, 10.

In order to enable all the tracks 48 within a section 47 to be moved towards the magnetic-head means the middle of the section 47 should be situated opposite the magnetic head 11a when the random access phase begins, and the belt 8 should be in its centre position in which the tape lengths in the two buffers 34, 35 are equal. Moreover, the length of the section 47 should not be larger than the length of each tape buffer 34, 35. In addition, the tape tension at the location of the magnetic-head means 9, 10 should be sustained during acceleration, deceleration and reversal of the direction of transport of the magnetic tape 7. Said buffer system meets all the requirements. The mass of the elements to be accelerated (the mass of the length of tape plus half the mass of the belt 8) is low, so that the tape-drive means 27 (the combination of the capstan 27 and the pressure roller 12) in the apparatus 1 are capable of providing the required acceleration and deceleration. Since the use of the belt 8 ensures that the changes in the lengths of the portions of the tape buffers 34, 35 guided over the belt 8 are complementary, i.e. the length reduction at one side of the belt 8 is equal to the length increase at the other side, the tension in the magnetic tape 7 will be maintained.

The buffer system is also very suitable for use in, for example, video recorders in order to read the relevant information from the tape during winding at different speeds, for example in the "search mode" of the video recorder.

The reel rotation then ensures that the tape 7 at the location of the guide rollers 22, 24 nearest the cassette 29 is moved with a first speed. The tape-drive means 27 ensure that at the location of the guide rollers 21, 23 nearest the magnetic-head means 9, 10 and at the location of the magnetic-head means 9, the tape 7 is moved with a second speed. The first speed of the tape 7 is also the revolution speed of the belt 8. The difference between the first and the second speed of the tape 7 is the translational speed of the belt 8. This translational speed is directed perpendicularly to the connecting line between the drive rollers 23, 24 of a pair and is obtained automatically without an additional drive owing to the difference between said first and said second speed. This translation enables the length of the guide sections 36, 37 to be varied, which is accompanied by a change in length of the tape portions guided over the belt 8.

Figure 7:
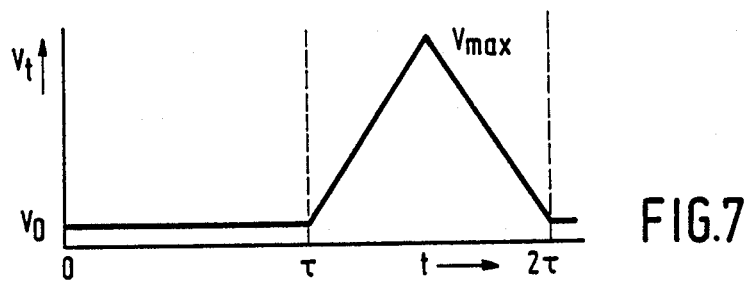
FIG. 7 is a graph of the magnetic-tape speed at the location of the magnetic-head means in an operational phase.

In this way the guide sections 36, 37 constitute tape buffers 34, 35, enabling the speed of the tape 7 past the magnetic-head means 9, 10 to be varied considerably at a semi-stationary winding speed of the reels 5, 6. This has the advantage that during fast winding the speed of the tape 7 relative to the magnetic-head means 9, 10 can be reduced for brief periods to scan said tape with the normal speed, whereas during the other periods the tape 7 can be moved past the magnetic-head means 9, 10 at a higher speed (FIG. 7). The position-detection element 38 controls the speed of the drive spindles 5, 6 and the capstan 27 in such a way that the belt 8 cannot exceed its permissible extreme position and in such a way that the tape tension is maintained constant.

Figure 8:
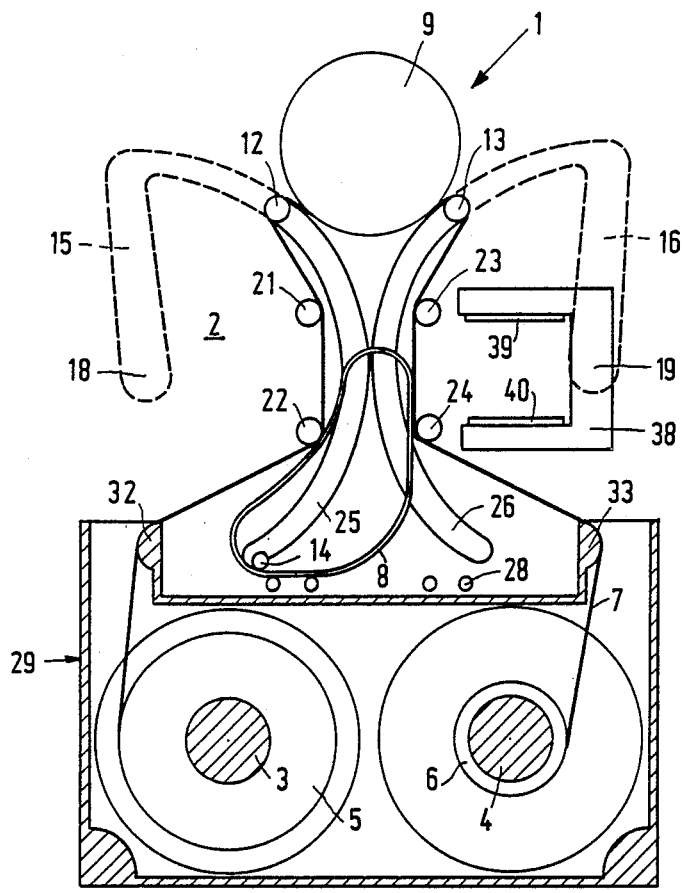
FIG. 8 illustrates a situation in which the belt is partly threaded-out.
Figure 9:
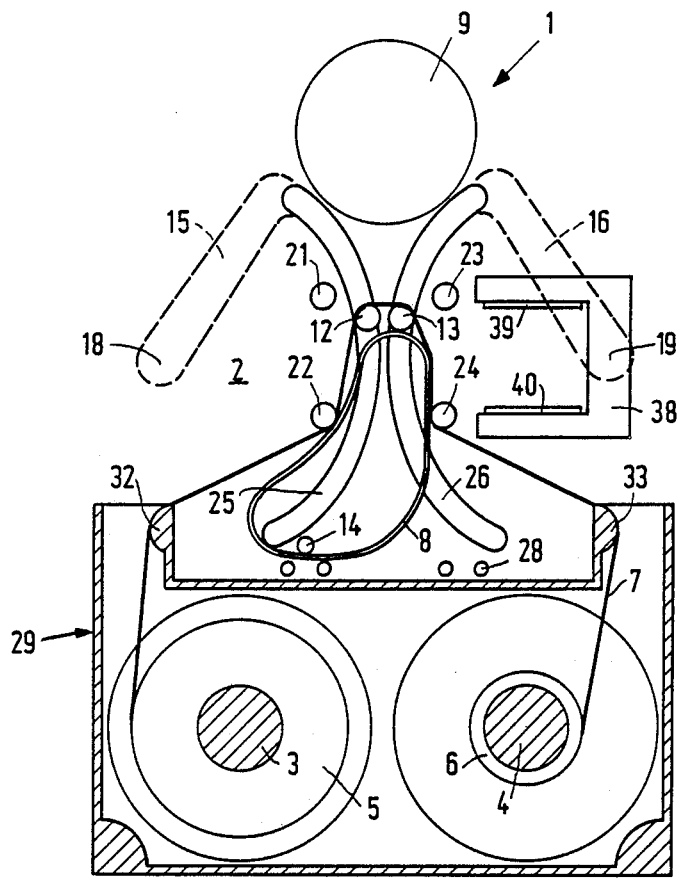
FIG. 9 shows a situation in which the magnetic tape and the belt have been threaded out partly, nearly into their initial positions.

Before the cassette 29 can be removed from the apparatus 1 the tape 7 and the belt 8 should be returned into their initial positions. The belt-threading pin 14 is then first brought into its initial position by rotating the spindle 20 carrying the arm 17 to which the belt-threading pin 14 is secured. The belt-threading pin 14 then withdraws the belt 8 from the tape-path branches and partly returns the belt 8 to its initial position (FIG. 8). Subsequently, the tape 7 is returned into its initial position by moving back the two tape-threading rollers 12, 13, which is effected by rotating the spindles 18, 19 of the arms 15, 16 carrying the tape-threading rollers 12, 13. The two tape-threading rollers 12, 13 then push the belt 8 back against the four pins 28 (FIG. 9) in the apparatus 1 and the tape 7 is wound onto the reels 5, 6 by the drive spindles 3, 4. It is then necessary that the right-hand tape-threading roller 13 is returned first, because this roller pushes the belt 8 to the right whereas the belt 8 at the left side is retained by the belt-threading pin 14. If the left-hand tape-threading roller 12 would be returned first the belt 8 will be situated at the extreme left inside the recess 30 in the cassette 29, because the belt 8 is not retained at the right. Now the cassette 29 can be removed from the apparatus 1.

The threading mechanism, the buffer mechanism, the control system for the buffer mechanism and the control system for information storage and random access to the information can also be employed in systems in which the information is recorded in one or more longitudinal tracks on the magnetic tape. In that case the rotatable head unit may be replaced by a stationary head unit. In a system with individual discontinuous tracks the tracks may alternatively extend perpendicularly to or in the longitudinal direction of the tape. However, the rotary head unit should then be adapted accordingly.

Moreover, the stationary head unit may be provided with a plurality of heads in the case of a plurality of address tracks. The stationary head unit may further comprise an erase head for erasing the information on the tape. Furthermore, the rotary head unit may be provided with a plurality of heads in order to achieve an even higher information density on the tape. The system is suitable both for analog and for digital information storage.

The threading means need not necessarily be actuated by means of arms which are rotatable about spindles. Instead, the threading means may be actuated by linkage mechanisms or slotted-link mechanisms. Alternatively, the threading means may be secured to elements which are moved over rails or through guideways. Moreover, the belt can be threaded by two or more threading pins, during which threading operation the belt need not necessarily be threaded completely into one tape-path branch, but may be threaded into both tape-path branches at the same time, or the guide elements can be moved outwards during threading to engage them over the belt.

The planes of movement of the arms of the belt-threading means need not necessarily be situated above those of the arms of the tape-threading means, but the two planes may also be interchanged. The supporting plate with the openings for the paths of movement of the tape-threading means may be dispensed with for reasons of constructional engineering. The four pins which are rigidly connected to the frame and against which the belt is clamped in the initial position may be replaced by one or more other elements such as, for example, a plate or a strip.

Instead of defining the position of the belt at one end portion it is alternatively possible to arrange detection means in the proximity of the permissible extreme positions of the belt end portions, which detection means indicate when the belt has reached one of its extreme positions. Moreover, a separate pressure roller, which presses the tape against the capstan in the operational position, can be moved along with the tape-threading means during threading of the tape instead of one of the tape-threading rollers being used as a pressure roller. Alternatively, the belt can be made of other materials, provided that these have a satisfactory elasticity, another suitable material being for example phosphor bronze.

We claim:

1. A magnetic-tape apparatus (1), comprising
a frame (2),
reel-drive means (3, 4) for two rotatable reels (5, 6) on which a magnetic tape (7) is wound for the purpose of tape transport from one reel to the other, a length of said magnetic tape (7) extending between the two reels,
magnetic-head means (9, 10) comprising at least one magnetic head (11) for recording and/or reproducing information on/from the magnetic tape (7),
movable tape-threading means (12, 13) constructed to bring the magnetic tape (7), which is movable between an initial position, in which the magnetic tape (7) is not in contact with the magnetic-head means (9, 10), and an operational position, in which the magnetic tape (7) is in contact with the magnetic-head means (9, 10), into said initial position or said operational position,
buffer means comprising an endless flexible belt (8) having two guide sections (36, 37) which constitute tape guides for the magnetic tape (7), the magnetic tape (7) being guided over the outer sides of said guide sections (36, 37), which buffer means, in said operational position, form two tape buffers (34, 35) which in relation to the tape transport are situated upstream and downstream of the magnetic-head means (9, 10) and which are capable of buffering parts of the length of the magnetic tape (7),
movable belt-threading means (14) constructed to bring the flexible belt (8), which is movable between an initial position, in which the belt (8) is not in contact with the magnetic tape (7) and is positioned at that side of the magnetic tape (7) which is remote from the magnetic-head means (9, 10) and in which the belt-threading means (14) are situated within the circumference of the belt (8), and an operational position, in which the belt (8) is in contact with the magnetic tape (7) in such a way that the belt (8) can act as a buffer, into said initial position or said operational position of the belt (8),
tape-drive means (27) for driving the magnetic tape (7) past the magnetic-head means (9, 10) at a location in that part of the tape path which is situated between the first (35) and the last (34) tape buffer, and
two pairs of guide elements (21, 22 and 23, 24) between which the belt (8) is guided in its operational position, the two guide elements of each pair, viewed in the tape-transport direction, respectively defining the beginning and the end of the guide sections (36, 37) of the belt (8) in the operational position and guiding the magnetic tape (7) in the operational position towards and away from the guide sections (36, 37), the paths of movement of the tape-threading means (12, 13) extending between said pairs of guide elements (21, 22 and 23, 24),
characterized in that in the non-constrained situation, in which situation the belt (8) is not subject to any external forces, the flexible belt (8) has at least substantially the shape of a circle, and the mutual arrangement of the guide elements (21, 22, 23, 24) and the properties of the belt (8) are such that, if the centre of the figure bounded by the belt circumference is situated between the four guide elements (21, 22, 23, 24), the belt (8) is in a stable situation in which, as a result of the balance between the internal forces caused by elastic deformation of the belt (8) and the forces exerted on the belt (8) by the guide elements (21, 22, 23, 24), the belt (8) adopts a shape characterized by two end portions which are bent through 180° and which adjoin two substantially parallel straight portions.

2. A magnetic-tape apparatus (1) as claimed in claim 1, characterized in that in said initial position the belt (8) is clamped between at least one stationarily arranged element (28) and the tape-threading means (12, 13) and in said initial position the belt (8) is situated in the space between the two reels (5, 6) and the magnetic tape (7).

3. A magnetic-tape apparatus (1) as claimed in claim 1, characterized in that the guide elements (21, 22, 23, 24) are arranged stationarily and the belt (8) is deformed elastically as it is brought into said operational position with the aid of the belt-threading means (14).

4. A magnetic-tape apparatus (1) as claimed in claim 3, characterized in that the belt-threading means comprise a belt-threading pin (14), and the path of movement of the belt-threading pin (14) extends between those two guide elements (22, 24), one of each pair, which are situated at the side of the reels (5, 6) and between both guide elements (21, 22) of one of the pairs, and as the belt (8) is brought into said operational position the belt-threading pin (14) brings the entire belt (8) into one of the tape-path branches between the magnetic-head means (9, 10) and the reels (5, 6), after which by take-up onto at least one of the reels (5, 6) the magnetic tape (7) is moved partly from one tape-path branch into the other tape-path branch to assume its operational position.

5. A magnetic-tape apparatus (1) as claimed in claim 4, characterized in that the belt-threading means comprise a belt-threading pin (14), each threading means (12, 13, 14) is secured to an arm (15, 16, 17) at one end of said arm, which arm (15, 16, 17) near its other end is secured to a rotatable spindle (18, 19, 20) having substantially the same orientation as the threading means (12, 13, 14), during threading-in the two tape-threading means (12, 13) are moved first and subsequently the belt-threading pin (14) and during threading-out the belt-threading pin (14) is moved first and subsequently the tape-threading means (12, 13), the movement of the arm (17) of the belt-threading pin (14) is performed in another plane than the movement of the nearest arm (15) of one of the tape-threading means (12), and the arms (15, 16, 17) to which the tape-threading means (12, 13, 14) are secured are curved in such a way that the movement of the arm (15, 16, 17) is not restrained by the presence of the guide elements (21, 22, 23, 24) or by the presence of the spindles (18, 19, 20) to which the arms (15, 16, 17) are secured.

6. A magnetic-tape apparatus (1) as claimed in claim 5, characterized in that the arm (17) of the belt-threading pin (14) is arcuate, and the arms (15, 16) of the belt-threading means (12, 13) each comprise two portions which extend at an angle of substantially 90° relative to one another.

7. A magnetic-tape apparatus (1) as claimed in claim 5, characterized in that the plane of movement of the arm (17) of the belt-threading pin (14) is situated above the planes of movement of the arms (15, 16) of the tape-threading means (12, 13).

8. A magnetic-tape apparatus (1) as claimed in claim 5, characterized in that during threading-in of the belt (8) and the magnetic tape (7), when they are both brought from an operational position into an initial position, after the movement of the belt-threading pin (14) the right-hand tape-threading means (13) begins to move first, followed by the left-hand tape-threading means (12).

9. A magnetic-tape apparatus (1) as claimed in claim 8, characterized in that the guide elements are constructed as guide rollers (21, 22, 23, 24), the tape-drive means comprise a capstan (27) and a pressure roller (12), the belt-threading means comprise a belt-threading pin (14), the tape-threading means are constructed as tape-threading rollers (12, 13), of which at least one (12) of the two rollers functions as a pressure roller for the capstan (27), the magnetic-head means comprise a rotatable (9) and a stationary (10) magnetic-head unit, which rotatable magnetic-head unit comprises at least one rotatable magnetic head (11a) and which stationary magnetic-head unit comprises at least one stationary magnetic head (11b), the frame comprises a supporting plate (2) formed with openings (25, 26) through which the tape threading rollers (12, 13) can move, and the drive means for the reels (5, 6) comprise drive spindles (3, 4).

10. A magnetic-tape apparatus (1) as claimed in claim 9, characterized in that the two reels (5, 6) are accommodated in a magnetic-tape cassette (29) whose housing is provided with two tape guides (32, 33) near its front corners, between which tape guide a taut part (31) of the tape extends when the cassette (29) is not in operation, which housing has a recess (30) behind said part of the tape, which recess has such a shape that the endless belt (8) can be positioned in said recess (30), and the threading means (12, 13, 14) are adapted to withdraw the magnetic tape (7) and the belt (8) from the magnetic-tape cassette (29) towards the magnetic-head means (9, 10) to bring the magnetic tape (7) and the belt (8) into their respectively operational positions.

11. A magnetic-tape apparatus (1) as claimed in claim 10, characterized in that the belt (8) is made of polyethylene terephthalate.

12. A magnetic-tape apparatus as claimed in claim 1, characterized in that the guide elements are arranged stationarily and the belt is deformed elastically as it is brought into said operational position with the aid of the belt-threading means.

13. A magnetic-tape apparatus as claimed in claim 2, characterized in that the belt-threading means comprise a belt-threading pin, and the path of movement of the belt-threading pin extends between those two guide elements, one of each pair, which are situated at the side of the reels and between both guide elements of one of the pairs, and as the belt is brought into said operational position the belt-threading pin brings the entire belt into one of the tape-path branches between the magnetic-head means and the reels, after which by take-up onto at least one of the reels the magnetic tape is moved partly from one tape-path branch into the other tape-path branch to assume its operational position.

14. A magnetic-tape apparatus as claimed in claim 1, characterized in that the belt-threading means comprise a belt-threading pin, and the path of movement of the belt-threading pin extends between those two guide elements, one of each pair, which are situated at the side of the reels and between both guide elements of one of the pairs, and as the belt is brought into said operational position the belt-threading pin brings the entire belt into one of the tape-path branches between the magnetic-head means and the reels, after which by take-up onto at least one of the reels the magnetic tape is moved partly from one tape-path branch into the other tape-path branch to assume its operational position.

15. A magnetic-tape apparatus as claimed in claim 1, characterized in that the belt-threading means comprise a belt-threading pin, each threading means is secured to an arm at one end of said arm, which arm near its other end is secured to a rotatable spindle having substantially the same orientation as the threading means, during threading-in the two tape-threading means are moved first and subsequently the belt-threading pin and during threading-out the belt-threading pin is moved first and subsequently the tape-threading means, the movement of the arm of the belt-threading pin is performed in another plane than the movement of the nearest arm of one of the tape-threading means, and the arms to which the tape-threading means are secured are curved in such a way that the movement of the arm is not restrained by the presence of the guide elements or by the presence of the spindles to which the arms are secured.

16. A magnetic-tape apparatus as claimed in claim 1, characterized in that the guide elements are constructed as guide rollers, the tape-drive means comprise a capstan and a pressure roller, the belt-threading means comprise a belt-threading pin, the tape-threading means are constructed as tape-threading rollers of which at least one of the two rollers functions as a pressure roller for the capstan, the magnetic-head means comprise a rotatable and a stationary magnetic-head unit, which rotatable magnetic-head unit comprise at least one rotatable magnetic head and which stationary magnetic-head unit comprises at least one stationary magnetic head, the frame comprises a supporting plate formed with openings through which the tape threading rollers can move, and the drive means for the reels comprise drive spindles.

17. A magnetic-tape apparatus as claimed in claim 1, characterized in that the two reels are accommodated in a magnetic-tape cassette whose housing is provided with two tape guides near its front corners, between which tape guide a taut part of the tape extends when the cassette is not in operation, which housing has a recess behind said part of the tape, which recess has such a shape that the endless belt can be positioned in said recess, and the threading means are adapted to withdraw the magnetic tape and the belt from the magnetic-tape cassette towards the magnetic-head means to bring the magnetic tape and the belt into their respectively operational positions.

18. A magnetic-tape apparatus as claimed in claim 1, characterized in that the belt is made of polyethylene terephthalate.

* * * * *